May 8, 1945. J. A. LUNDEEN 2,375,375
DRIP TIMING DEVICE
Filed Aug. 4, 1944
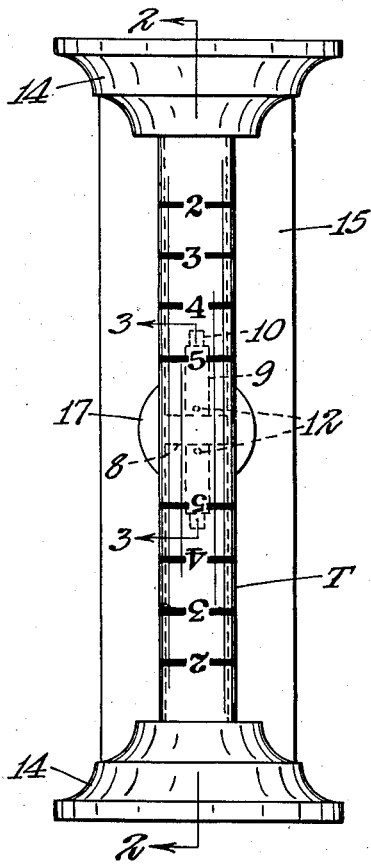
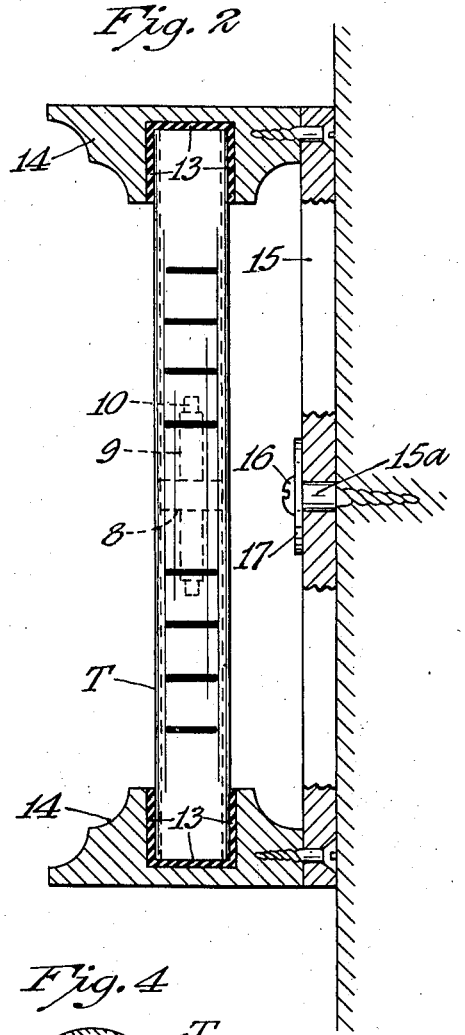
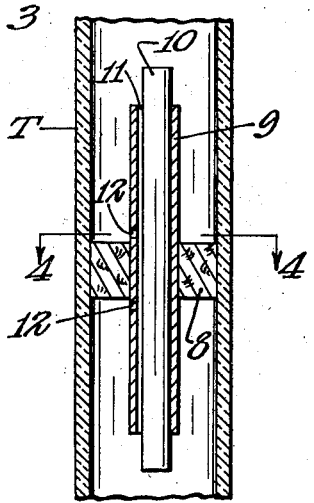
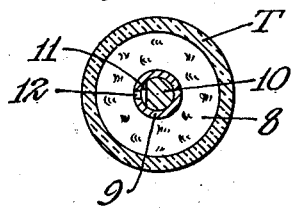
INVENTOR.
John A. Lundeen
BY
Williamson & Williamson
ATTORNEYS Patented May 8, 1945

2,375,375

UNITED STATES PATENT OFFICE 2,375,375

DRIP TIMING DEVICE

John Alfred Lundeen, Pequot Lakes, Minn.

Application August 4, 1944, Serial No. 548,113

6 Claims. (Cl. 58—1)

This invention relates to time measuring or indicating mechanism and particularly to a reversible drip timing device wherein a thin liquid such as ether or alcohol having a low viscosity and one which is changed very little by change of temperature, is utilized as a medium.

It is an object of my present invention to provide a simple, inexpensive but highly accurate drip timing device consisting in a sealed transparent gauging tube containing a quantity of preferably colored liquid in combination with highly efficient mechanism mounted within the tube to cause uniformly and relatively slow dripping of the liquid from one chamber to another whereby time intervals may be gauged or indicated through preferably the association of graduations and indicia with the gauging tube.

Heretofore, to my knowledge, it has been impractical if not considered impossible to utilize the dripping of a liquid in place of granular solid material such as sand and the like for time indicating devices. Gravity actuated timing devices using solid particles are very unreliable and inaccurate since the shape and size of the individual particles vary materially and furthermore in that the size of the device must be necessarily large to obtain a measuring of time intervals in excess of two or three minutes.

In the utilization of a liquid for timing purposes, the difficulty hereto has apparently been encountered in the ability to transfer air bubbles from one chamber to another in the gauging tube or glass simultaneously with the passage of liquid from the second chamber to the first.

With my improved structure the upper and lower chambers of a gauging tube containing a quantity of liquid are so interconnected that a drop of liquid from the upper half of the tube may pass downward to the lower chamber forcing a small quantity of bubbled air upwardly from the lower chamber simultaneously with the downward passage of the liquid, thereby overcoming the effect of vacuum in the interconnecting tube or passage.

The foregoing and other objects of my invention will be more clear from the following description made in connection with the accompanying drawing, wherein like reference characters refer to similar parts throughout the several views and in which—

Fig. 1 is a front elevation of an embodiment of my invention.

Fig. 2 is a vertical section taken on the line 2—2 Fig. 1 showing the device attached to a vertical supporting wall.

Fig. 3 is a vertical section on an enlarged scale taken on the line 3—3 of Fig. 1 showing the construction of my intercommunicating drip passage and the air ports connected wtih the same.

Fig. 4 is a cross section taken on the line 4—4 of Fig. 3.

In the embodiment illustrated, I provide an elongated gauging tube T constructed of transparent material such as glass or plastic and this tube is preferably of cylindrical cross section and of uniform internal diameter throughout.

Tube T is centrally divided within by a disc partition 8 which may be constructed of rubber, cork or other relatively compressible and elastic material impervious to liquid. The disc 8 tightly fits the interior periphery of the tube and is centrally and axially apertured to receive my interconnecting drip mechanism.

This drip mechanism as shown, comprises an axially extending open ended tube 9 of relatively small diameter as compared with the gauge tube T and with its medial portion fitted through the disc 8 with external sealed connection with the apertured portion thereof and having its ends extended equidistant from the adjacent horizontal surface of disc 8. Fixedly mounted within the tube 9 is a drip rod 10 having its two ends projected a short distance beyond the corresponding ends of tube 9. Drip rod 10 as shown has one of its sides longitudinally flatted throughout its length and otherwise fits tube 9 tightly and is spot welded or otherwise connected or bonded to the interior of said tube. The flatted portion of rod 10 in cooperation with the interior of the tube, forms a very narrow longitudinal passage 11 extending the full length of tube 9 and interconnecting the upper and lower chambers defined in the gauge tube T through the medium of central partition disc 8. In the embodiment illustrated which is adapted for partial filling with ether, alcohol or a very thin fluid, the width of the passage 11 is such that it will accommodate longitudinally a drill or rod of .0249 inch although it will of course, be understood that considerable variation may be made in the width of this feeder tube passage.

Communicating with the longitudinal passage 11 within feeder tube 9, are a pair of lateral ports or apertures 12 formed through the tube in opposition to the flatted side of drip rod 10 and disposed one on each side of the partition disc 8 and in juxta-position to disc 8.

Gauge tube T is partially filled with a suitable liquid such as ether and to facilitate reading of the gauge, the liquid is preferably brightly colored. The amount of liquid employed within the gauge tube must be somewhat less in volume than the capacity of one of the two chambers between the central partition 8 and the ends of the tube.

The two ends of gauge tube T are closed and sealed as shown by means of tight fitting rubber or elastic cups 13 which may be cemented to the extremities of the tube and which in any event are secured to the tube ends with sealed effect to prevent passage of moisture, liquid or air. The sealed tube with the drip mechanism and liquid therein is then properly calibrated for the various time intervals desired and indications such as the circumferential lines or bands may be printed, etched or otherwise inscribed on the exterior of the tube and may have numerals or other indicia associated therewith to indicate the various time periods. Thus in the embodiment illustrated, both chambers of the gauge tube are provided with circumferential lines and numerals to indicate time periods of two, three, four and five minutes respectively.

The device as shown includes a mounting comprising a pair of base members or short pedestals 14, having drilled therein axial recesses in which the sealed ends of the tube are received and fixed and a back connecting member 15 in the form of a strip preferably having its front surface lacquered or highly polished or provided with a shining metal surface for reflecting purposes. The back connecting member 15 at its end, is secured to flatted peripheral portions of the base members 14 and has a central aperture 15a through which a pivot screw 16 may be extended to pivotally secure the device to a vertical supporting surface. As shown a washer 17 is interposed between the head of the pivot screw 16 and the exterior surface of the back member, and frictional means may be applied between the screw and the passage 15a to prevent accidental swinging of the device from vertical position.

In use, the device is vertically disposed and tilted to a position in the manner of an hour glass with the liquid above the partition 8. The narrow elongated passage through the drip tube 9 allows a drop of liquid to pass downwardly while simultaneously a particle or bubble of air enters the passage 11 usually through the lower lateral port 12, this particle of air as it passes the port 12 in the upper half of the drip tube allows the drop of liquid to pass downwardly and thereby overcomes the vacuum in the drip tube 9 and in the upper chamber of the gauge tube T.

Thus, by the cooperation of the longitudinal interconnecting passage 11 and the two lateral ports 12, disposed on opposite sides and in juxtaposition to the central partition, uniform intermittent dripping of the liquid from the upper chamber to the lower chamber, is obtained.

The level of the liquid in the upper tube is watched and when the level is aligned with the appropriate gauge line and indicia, the desired time period is accurately determined.

In the next operation of the device, the entire device is bodily tilted or reversed, it being of course, necessary that before such reversal all the liquid be disposed in the lower chamber.

Assuming that the measuring liquid utilized is not subject to any considerable fluctuation in volume due to temperature change, the device will function very accurately in long continued use. Ether has proven to be a desirable liquid for measuring purposes due to its very slight change in volume due to temperature variations, but it will of course be understood that various other thin liquids may be equally well utilized.

From the foregoing description, it will be seen that I have provided a comparatively simple, inexpensive, reversible drip timing device, capable of wide general use for indicating a large variety of different time periods as well as being adapted for wide use in connection with other devices where the dripping of a measuring or indicating liquid is desired, in connection with associated mechanisms.

It will of course be understood that various changes may be made in the form, details, arrangement and proportions of the parts without departing from the scope of my invention.

What is claimed is:

1. A drip timing device comprising a vertically disposed reversible gauge tube having closed ends and containing a quantity of thin liquid, a partition centrally dividing the interior of said gauge tube, to form upper and lower chambers, a drip conduit mounted longitudinally within said gauge tube and extending through said partition and connected with sealed effect thereto, said conduit having drip openings adjacent the respective ends thereof and having a narrow passage extending throughout substantially the length thereof and further having a pair of small lateral air passages formed therein communicating with said narrow passage, one of said lateral air passages being disposed at each side of said partition adjacent the same.

2. A drip timing device comprising a vertically disposed reversible gauge tube having sealed ends and containing a quantity of thin liquid, a partition centrally dividing the interior of said tube to form upper and lower measuring chambers, a drip conduit mounted longitudinally within said tube and extending through said partition and connected therewith with sealed effect, said conduit having drip openings adjacent the respective ends thereof and having a narrow longitudinal passage extending therethrough and having rod elements at its extremities extending from said openings, said conduit further being provided with a pair of small lateral air ports communicating with said longitudinal passage and one being disposed at each side of said partition, adjacent the same.

3. The structure set forth in claim 1 and, said gauge tube being provided with a transparent gauging portion extending the greater portion of the length thereof and having graduations spaced at predetermined intervals longitudinally of said tube from said central partition to indicate measurements determining various intervals of time.

4. The structure set forth in claim 1 and, said gauge tube being constructed of transparent material and provided with longitudinally spaced graduations for each of said measuring chambers and a reversible mounting for said tube including a backing member disposed parallel to the axis of said tube and having a reflecting surface.

5. A drip timing device comprising a vertically disposed, reversible gauge tube having closed ends and containing a quantity of thin liquid, a partition centrally dividing the interior of said gauge tube to form upper and lower chambers, a drip tube mounted longitudinally within said gauge tube and extending through said partition and connected with sealed effect thereto, a drip rod fixedly mounted within said tube and cooperating with the interior thereof, to form a narrow elongated passage interconnecting said two chambers, said rod having its ends projecting somewhat beyond the corresponding ends of said drip tube and said drip tube having a pair of small lateral apertures formed therein communicating with said narrow intercommunicating passage and one being disposed at each side of said partition adjacent the same.

6. A drip timing device comprising a vertically disposed reversible gauge tube having closed ends and containing a quantity of thin liquid, a partition centrally dividing the interior of said gauge tube, to form upper and lower chambers, means mounted longitudinally within said gauge tube for defining an open ended drip passage, said means extending through said partition and connected with sealed effect thereto, said means having a pair of small lateral air passages formed therein communicating with said drip passage, one of said lateral passages being disposed at each side of said partition adjacent the same.

JOHN ALFRED LUNDEEN.